United States Patent [19]

Broome

[11] 4,367,010

[45] Jan. 4, 1983

[54] ERECTING TELESCOPE

[75] Inventor: Barry Broome, Glendora, Calif.

[73] Assignee: Sport-O-Scope, Inc., Bethlehem, Pa.

[21] Appl. No.: 177,140

[22] Filed: Aug. 11, 1980

[51] Int. Cl.³ .......................................... G02B 23/00
[52] U.S. Cl. .................................................. 350/563
[58] Field of Search ................................. 350/54, 432

[56] References Cited

U.S. PATENT DOCUMENTS

| 3,153,690 | 10/1964 | Kuyt et al. | 350/54 X |
| 3,583,785 | 6/1971 | Boardman | 350/54 X |
| 3,722,979 | 3/1973 | Mikami | 350/432 X |
| 4,240,701 | 12/1980 | Lytle | 350/432 |

Primary Examiner—John K. Corbin
Assistant Examiner—Matthew W. Koren

Attorney, Agent, or Firm—Webb, Burden, Robinson & Webb

[57] ABSTRACT

A terrestrial (erecting) telescope that may be inexpensively manufactured with plastic lenses but which telescope will provide a high quality image. The telescope comprises an objective lens, usually a single plano-convex lens, mounted in an outer tube. The telescope further comprises an inner tube in which are fixed an erecting lens system and an eye piece lens system. The erecting lens system comprises two identical plastic lens elements with opposite spherical and aspherical surfaces. The spherical surfaces of the erector lenses are facing. The eye piece lens system comprises a Ramsden eye piece having two plano-convex lenses with facing spherical surfaces. The aperture stop is positioned equidistance between the lenses of the erector lens system.

7 Claims, 3 Drawing Figures

OBJECT END

IMAGE END

ERECTING TELESCOPE

BACKGROUND

The terrestrial telescope is hundreds of years old. Galileo is said to have invented the first terrestrial telescope in 1609. Today the most elegant and high quality telescopes are made with numerous ground glass lenses usually with more than one type of glass. Of course, these are very expensive.

There is a need for an inexpensive telescope that can be sold to and used by spectators at sporting events, for example, which telescope will provide a good quality image. It is particularly desirable that the exit pupil (explained further herein) be large, say 3 millimeters or more, the eye relief long so that the telescope can be used without removing eyeglasses and that all of the optical parts be made with one optical grade plastic. The larger the exit pupil the more brilliant the image which is especially important at sporting events at night under artificial lighting. These conditions, i.e., lenses of one index of refraction, large exit pupil and long eye relief, all tend to detract from the image quality (freedom from aberrations).

It is an advantage according to this invention to provide a telescope especially useful at sporting events and the like which does not sacrifice image quality yet has the desired large exit pupil, long eye relief and inexpensive plastic lenses. Consider that a commercially available terrestrial 6X telescope with plastic lenses has a one millimeter exit pupil, a nine millimeter eye relief and the following image characteristics:

Object field of view: 200 feet at 1,000 yards

Image quality in object field: 6 arc minutes or better over the field with 10 arc minutes blue halo at all points in field.

A 6X terrestrial telescope made according to the teachings of this application having a four millimeter exit pupil, twenty-one millimeter eye relief, and made with only five lens elements all of optical quality acrylic had the following image characteristics:

Object field of view: 275 feet at 1,000 yards

Image quality in object field: 3 arc minutes or better over full field (no color halo), 1 arc minute over central half of field (the limit of visual resolution).

It is an object of this invention to provide a relatively inexpensive erecting telescope with all lens elements made, for example, by injection molding with but one type of optical grade plastic.

It is a further object to maximize the clearly focused field of view.

It is yet another object to provide long eye relief (the distance from the surface of the eye piece to user's eye for optimum use). It is still another advantage that only four configurations of lens elements are used (one configuration is used twice) thus minimizing the initial production costs.

It is yet another advantage to provide a relatively large exit pupil diameter, say three to four millimeters.

It is a still further object to provide a substantially halo-free image (minimal color aberration).

As with any optical system, it is desirable to eliminate or reduce to an acceptable minimum the various aberrations that arise in such systems including the monochromatic aberrations; namely, spherical aberration (variation in focus with distance from optical axis), coma (variation in magnification with distance from optical axis), astigmatism (different focus for object height and width, i.e., tangential and sagittal images do not coincide), and distortion (square object produces pin cushion image, for example). These aberrations are sometimes referred to as the Siedel aberrations. Additionally, two color aberrations are potentially present including longitudinal (different color light has different focus through the system) and lateral (different color light has different magnification through the system). Eliminating or reducing these various aberrations in an elegant multi-lens optical system, in which the lens elements may have varied indices of refraction, is challenging. Hence, to provide an inexpensive telescope with only four different lens configurations (five lenses total) all made from one type of lens plastic (thus having identical index of refraction), is a unique achievement.

A terrestrial telescope made with spherical glass lenses and with the same constraint (four different lens elements, five total lenses, all with the same refractive index) would at best offer slightly smaller field of view and the image quality of the outer 25% of the field of view would be substantially poorer. By providing elliptically shaped surfaces on the outer faces of the erector lens elements (at essentially no cost penalty with injection molded plastic elements but very costly with glass elements) the image quality almost magically improves so that the image is equally sharp over the full field of view with essentially no visual accommodation by the observer's eye required. Locating the elliptical (aspherical) surface near the intermediate image formed by the object lens element makes the errors in surface figure essentially negligible while the curvature of the inner surface is substantially flattened. The herein described telescope actually exceeds the performance of an analog design made with spherical glass lenses.

SUMMARY OF THE INVENTION

Briefly according to this invention, there is provided an erecting telescope comprising an outer tube, an object lens fixed at the object end of the outer tube, an inner tube slidable within the outer tube supporting erector lens and eye piece lens systems. The lens elements of the telescope are five rigid optical plastic lenses. The eye piece lens comprises two plano-convex elements with facing convex surfaces. The erector lens comprises a couplet of biconvex lenses having facing spherical surfaces and opposite aspherical surfaces. Preferably the object lens is plano-convex with the spherical surface facing the object. Still further, a field stop is mounted in the inner tube before the first erector lens element. Preferably, an aperture stop is mounted equidistantly between the erector lenses.

The aperture and field stops and lens elements in the inner tube are spaced apart by cylindrical spacers within the inner tube. Also, the portion of each lens that cannot be irradiated due to the field stop comprises a hollow cylinder integral with the lens and coaxial with optical axis.

THE DRAWINGS

DESCRIPTION OF THE PREFERRED EMBODIMENTS

A terrestrial telescope comprises an objective lens system that forms a real image at its focal plane, an erector lens for forming a second but inverted real image and an eye piece through which the second real image is viewed. The user's eye becomes part of the optical system in the sense that the eye lens (which should be placed at the exit pupil) focuses the rays emerging from the telescope upon the retina to form an image.

An objective lens is a converging lens which forms a real image of the distant object at its focal plane. Typically this lens is an achromatic doublet (a positive crown glass element and a negative flint glass element). According to this invention, the objective lens is a single plastic lens comprising a convex surface facing the object and an opposite face which is flat or very nearly flat. This configuration minimizes the coma and spherical aberration of the real image.

An erector lens system may comprise a single element but, in quality telescopes, most often consists of achromatic doublets with crown glass elements facing. According to this invention, two symmetrical biconvex plastic lens elements comprise the erector system. Each element has a spherical surface and an aspherical surface. The spherical surfaces face each other. The aperture stop (this determines the diameter of the cone of light energy which the system will accept from an axial point on the object) is located equally spaced between the erector elements. The location of the aperture stop further aids in the minimization of lens aberration. The aspheric surface is uniquely placed near the intermediate image (real image of the objective) so that errors in surface figure are essentially negligible and the image surface is substantially flatened. The spherical aberration of the erector lens system is substantially eliminated.

Eye pieces often comprise two or more elements (in inexpensive telescopes and binoculars—even more in elegant optical systems) which elements often comprise an achromatic couplet as the eye lens and a plano-convex lens as the field lens. In the telescope disclosed herein, the eye piece comprises two plano-convex lenses with facing convex surfaces. This type of eye piece is known as a Ramsden eye piece. The well known characteristics of a Ramsden eye piece are that it is not the best simple eye piece for correcting aberrations but does provide a larger possible eye relief. The long eye relief makes use while wearing eyeglasses much simpler.

Figure 1:
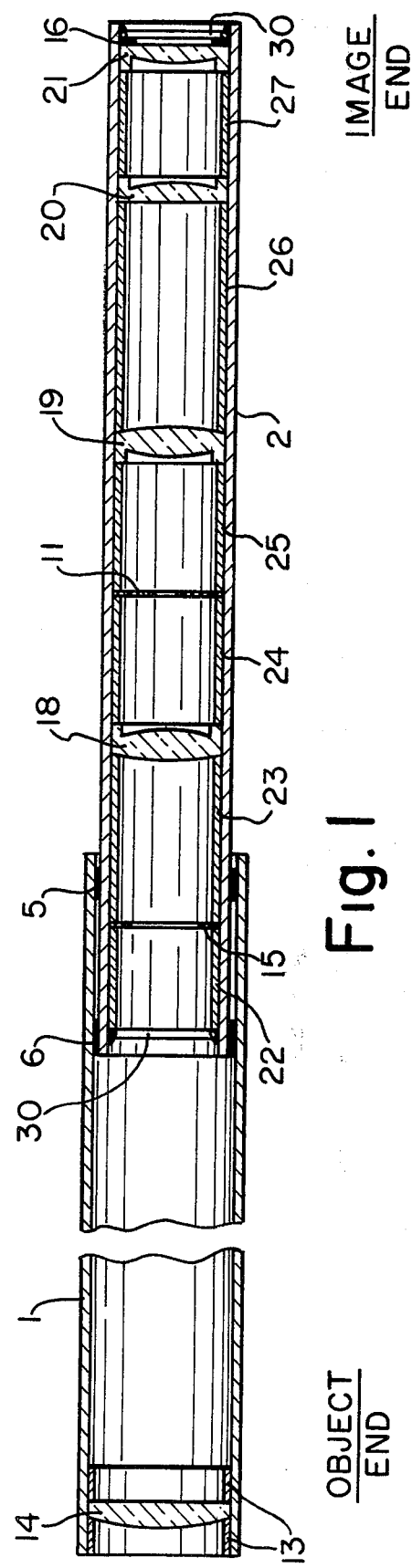
FIG. 1 is a section view through a telescope according to this invention.

Referring now to FIG. 1, the telescope according to this invention comprises an outer tube 1 which may be formed of black ABS plastic extruded and cut to the desired axial length, say about 180 millimeters. It is, of course, essential that the tube exhibit no bow or less than about 0.4 millimeters over the entire length thereof. An inner tube 2 which may be made in a similar manner to the outer tube has a length of, say about, 190 millimeters. Of course, the inner tube must slide within the outer tube with spacers positioned therebetween.

At the image end of the outer tube 1, annular retainer ring 5 is glued to the inner surface thereof. At the object end of the inner tube, a similar retainer 6 is glued to the outer surface. After the lenses and retainers are installed in the inner tube as explained hereafter, the inner tube is slid into the object end of the outer tube. The retainer rings 5 and 6 prevent the inner tube from entirely emerging from the other end of the outer tube. The retainer rings may be extruded plastic or coil wrapped tubing.

At the object end of the outer tube, two retainer rings 13 are glued to the inner diameter of the outer tube to hold the object lens 14 in place. The retainer rings 13 also serve to restrict movement of the inner tube within the outer tube when they are fully collapsed.

The field stops 15 and 16 and aperture stop 11 are thin (say 0.5 millimeter steel discs with apertures drilled or stamped therein). A black finish is desirable. The lens elements including the stops, the erector couplet elements 18, 19 and the eye piece elements 20, 21 are held apart by cylindrical spacers. The spacers 22, 23, 24, 25, 26, and 27 comprise extruded plastic or coiled wrapped paper tubing. The axial length of the spacers is a critical dimension and must be, for example, ±1.5 millimeters of the specified dimension.

Figure 2:
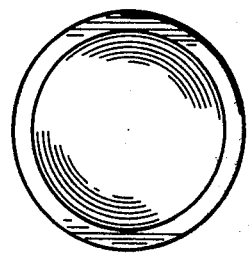
FIG. 2 is axial view of a lens suitable for use as an erector lens element according to this invention.
Figure 3:
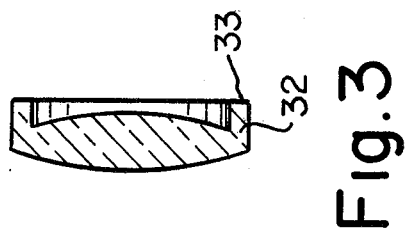
FIG. 3 is a section view taken along lines III—III of FIG. 2.

Referring to FIGS. 2 and 3, it is preferred that the lens elements be injection molded optical grade plastic. Preferably the elements have a hollow cylindrical portion 32 outside the object field thereof which serves to increase the axial length of the portion of the lenses bearing upon the inner surface of the inner tube. This increases the stability of the lenses and assures good optical alignment. Also, it provides a permissible location for ejector pin marks; namely, on an axial surface 33 of the hollow cylindrical portion.

The spacers, lenses and aperture stops are held within the inner tube by split rings 30 which may be inserted into small grooves provided on the inner surface of the inner tube.

The following table sets forth the details of a preferred optical system according to this invention. The dimensions are given in millimeters where $R_1$ is the radius of curvature of the object side of the lens element and $R_2$ is the radius of curvature of the opposite side. Positive radius indicates the center of curvature is in the direction from object to eye piece. T equals the thickness of the elements at the optical axis. D equals distance to the next stop or lens element.

| Item | $R_1$ | $R_2$ | T | D |
|---|---|---|---|---|
| Object Lens | 93.66 | inf. | 3.5 | Variable: 188 when object at infinity and real image near field stop. |
| Field stop | | | | Approximately 30 |
| Erector (first element) | aspheric | −22.44 | 5.0 | 24.7 |
| Aperture stop | | | | 24.7 |
| Erector (second element) | +22.44 | −aspheric | 5.0 | 40.67 |
| Eye piece (field lens) | inf. | −30.59 | 3.75 | 21.34 |
| Eye piece (eye lens) | 21.44 | inf. | 3.0 | 21 (to exit pupil) |

The aspheric surfaces of the erector lenses have a sag that may be defined mathematically as follows:

$$\frac{.658078 Y^2}{1 + \sqrt{1 - 2.7947808 Y^2}} - .38534 Y^4 - .87232 Y^6$$

The field stop has an opening therein which has a diameter of 14.5 millimeters.

The aperture stop has an opening therein which has a diameter of 3.5 millimeters.

The approximate length of the telescope is 320 millimeters (focused on a distant object) and 225 millimeters collapsed.

Having thus described the invention with the detail and particularity required by the Patent Laws, what is desired protected by Letters Patent is set forth in the following claims.

I claim:

1. In an erecting telescope comprising an outer tube, an object lens fixed at the object end of said outer tube, an inner tube slidable within the outer tube, erector lens and eye piece lens elements fixed in said inner tube, the improvement comprising all elements being rigid optical plastic, the eye piece lens comprising two convex elements with facing spherical surfaces, the erector lens comprising a couplet of biconvex elements having facing spherical surfaces and opposite aspherical surfaces, whereby aberrations are reduced and the field of view is increased.

2. The erecting telescope according to claim 1 wherein the object lens is convex with a spherical surface facing the object.

3. The erecting telescope according to claims 1 or 2 wherein the field stop is mounted in the inner tube before the first erecting element.

4. The erecting telescope accordong to claims 1 or 2, wherein an aperture stop is positioned equidistantly between the erecting elements.

5. The erecting telescope according to claims 1 or 2 having an eye piece designed for eye relief of about 20 millimeters and exit pupil of about 4 millimeters.

6. An erecting telescope according to claim 1 wherein the lens and stops in the inner tube are spaced apart by tubing having an inner diameter equal to or greater than the diameter of the aperture of the field stop.

7. An erecting telescope according to claims 1 or 6 wherein the rigid plastic lens elements have a peripheral cylindrical flange coaxial with the optical axis and spaced outwardly of the diameter of the aperture of the field stop.

* * * * *